H. GALE.
PLOW.
No. 7,253. Reissued Aug. 8. 1876.
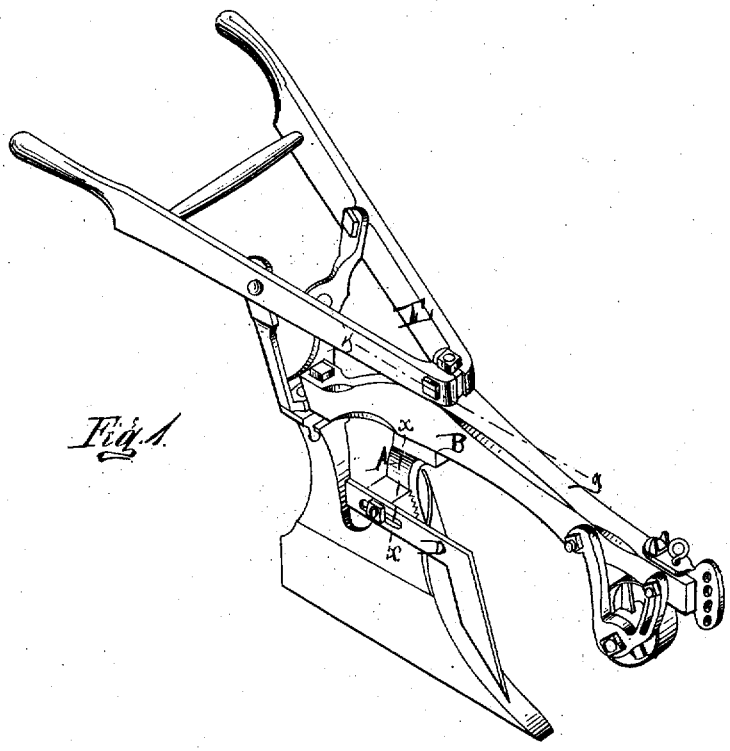
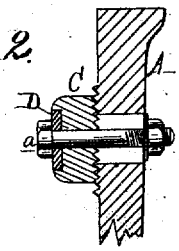
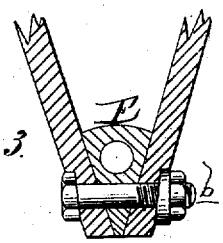
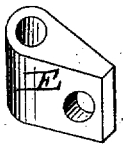
Attest:
Edward Baithell
C. R. Hulett
Inventor:
H. Gale
By Att.
Phil. S. Sprague.
N. PETERS, PHOTO-LITHOGRAPHER, WASHINGTON, D. C.

UNITED STATES PATENT OFFICE.

HORATIO GALE, OF ALBION, MICHIGAN, ASSIGNOR TO THE GALE MANUFACTURING COMPANY.

IMPROVEMENT IN PLOWS.

Specification forming part of Letters Patent No. 159,174, dated January 26, 1875; reissue No. 7,253, dated August 8, 1876; application filed July 25, 1876.

*To all whom it may concern:*

Be it known that I, HORATIO GALE, of Albion, in the county of Calhoun and State of Michigan, have invented an Improvement in Plows, of which the following is a specification:

My invention relates, in a center-draft plow, to the devices for adjusting the colter to a line with the land-side and point, and also, if required, for adjusting said colter in both the horizontal and vertical planes; also, to the devices for securing the handles to the standards, so that the handles are adjustable to pitch, as more fully hereinafter set forth.

Figure 1 is a perspective view. Fig. 2 is a vertical cross-section of the standard and colter-block at *x x* in Fig. 1. Fig. 3 is a horizontal section through the front ends of the handles in the plane *y y*. Fig. 4 is a perspective view of the washer.

In the drawing, A represents the standard, and B the beam, of a center-draft plow. In plows of this class the colter cannot be attached to the beam, as in side-draft plows, because the colter would be brought into action within the line of the point. This renders it necessary to adopt a device by means of which the colter can be brought to the proper point directly over the point of the plow, and as one of the ways in which this may be done, a block, C, is interposed between the standard A and the colter D, sufficiently thick to throw the colter into a vertical line with the land-side of the plow-point. The land-side face of this standard may be cast with horizontal serrations, to receive and engage corresponding serrations on the inner face of the block C attached to the standard by a bolt, *a*, passing through both. The outer face of the block has a longitudinal recess molded in it to receive the horizontally-bent shank of the colter D, which is slotted to receive the bolt *a*, which thus secures the colter and block to the standard, the bolt-hole of which is a vertical slot to permit the block to be adjusted up or down, as circumstances may require. The bolt-hole in the colter-shank may be a longitudinal slot, to adjust the colter longitudinally, but, in practice, such adjustment will not often be found necessary. The shank or upper end of the standard extends through the beam, terminating in a stud-bolt, upon which is sleeved a triangular washer, E, up through which the shank of the standard passes, and is secured by a nut on the upper end of said shank, in front of which a horizontal hole is cored in the said washer, against the sides of which the front ends of the handles are brought, and are secured thereto by a bolt, *b*, passing through all. The handles are adjustable as to pitch by bolts passing through vertical slots in a forked jack rising from the shelf-piece at the top of the heel-standard.

The advantages of this construction are that the handles for various sizes of plows are all of one size, fitting and adjustable to all sizes, can be compactly stowed for shipment, and are cheap in construction, as it enables the manufacturer to make all his plow-handles of uniform size and shape with special machinery.

What I claim as my invention is—

1. In center-draft plows, and in combination with the standard and colter, the block C, interposed between the said standard and colter, for the purposes specified.

2. The horizontally-recessed and serrated colter-block C, in combination with a serrated plow-standard, substantially as described.

3. The triangular washer E, combined with the standard-shank and handles of a plow, substantially as and for the purpose set forth.

HORATIO GALE.

Witnesses:

J. L. MILLER,

S. P. BROCKWAY.